3,537,207
ARTIFICIAL FISHING LURE WITH CHAIN REINFORCED SECTIONAL BODY AND PLASTIC WEED GUARD
Bingham A. McClellan, John K. Peters, and David J. Hicks, Traverse City, Mich., assignors to McClellan Industries, Inc., Traverse City, Mich.
Filed July 26, 1968, Ser. No. 747,958
Int. Cl. A01k 85/00
U.S. Cl. 43—42.24                                7 Claims

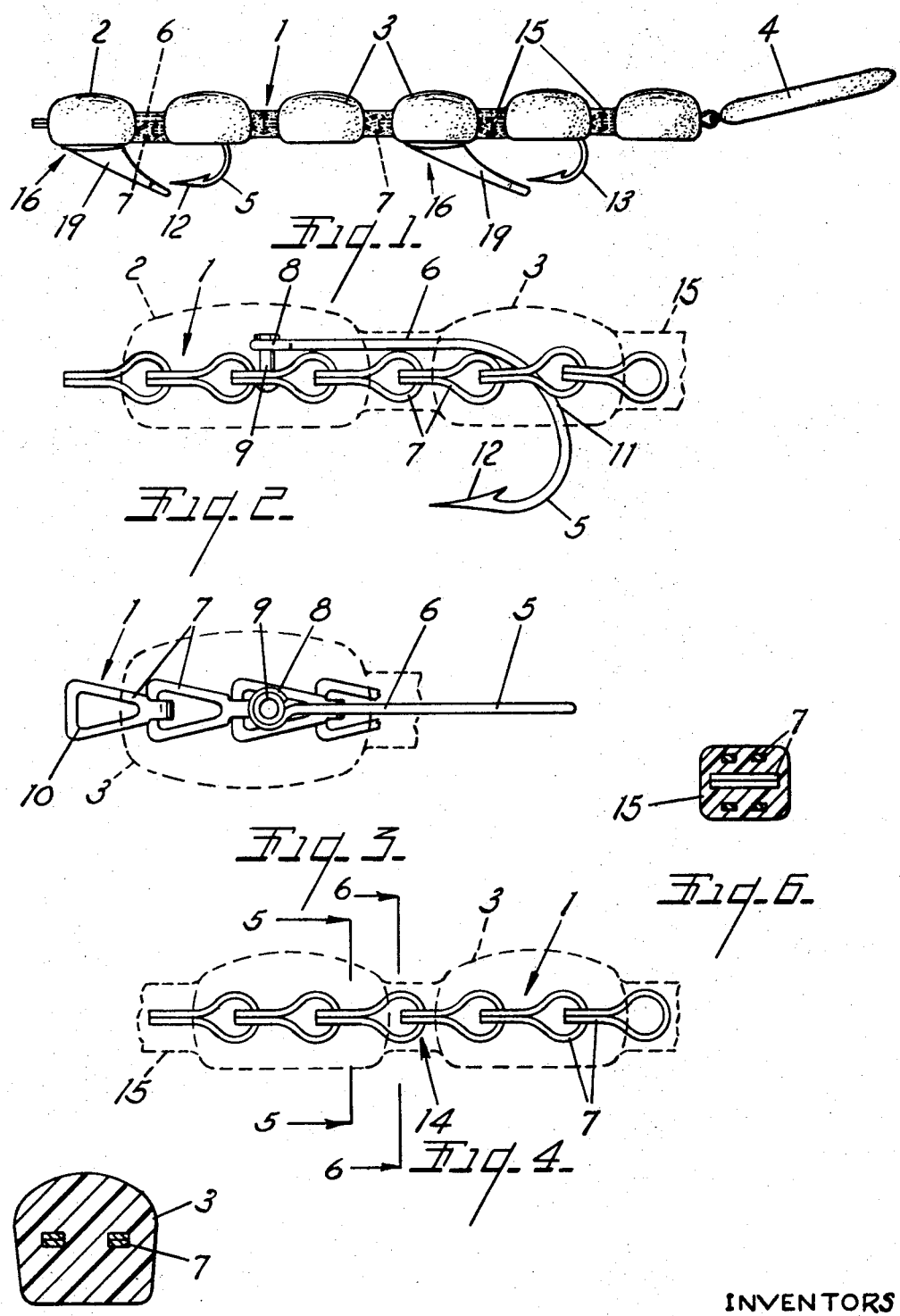

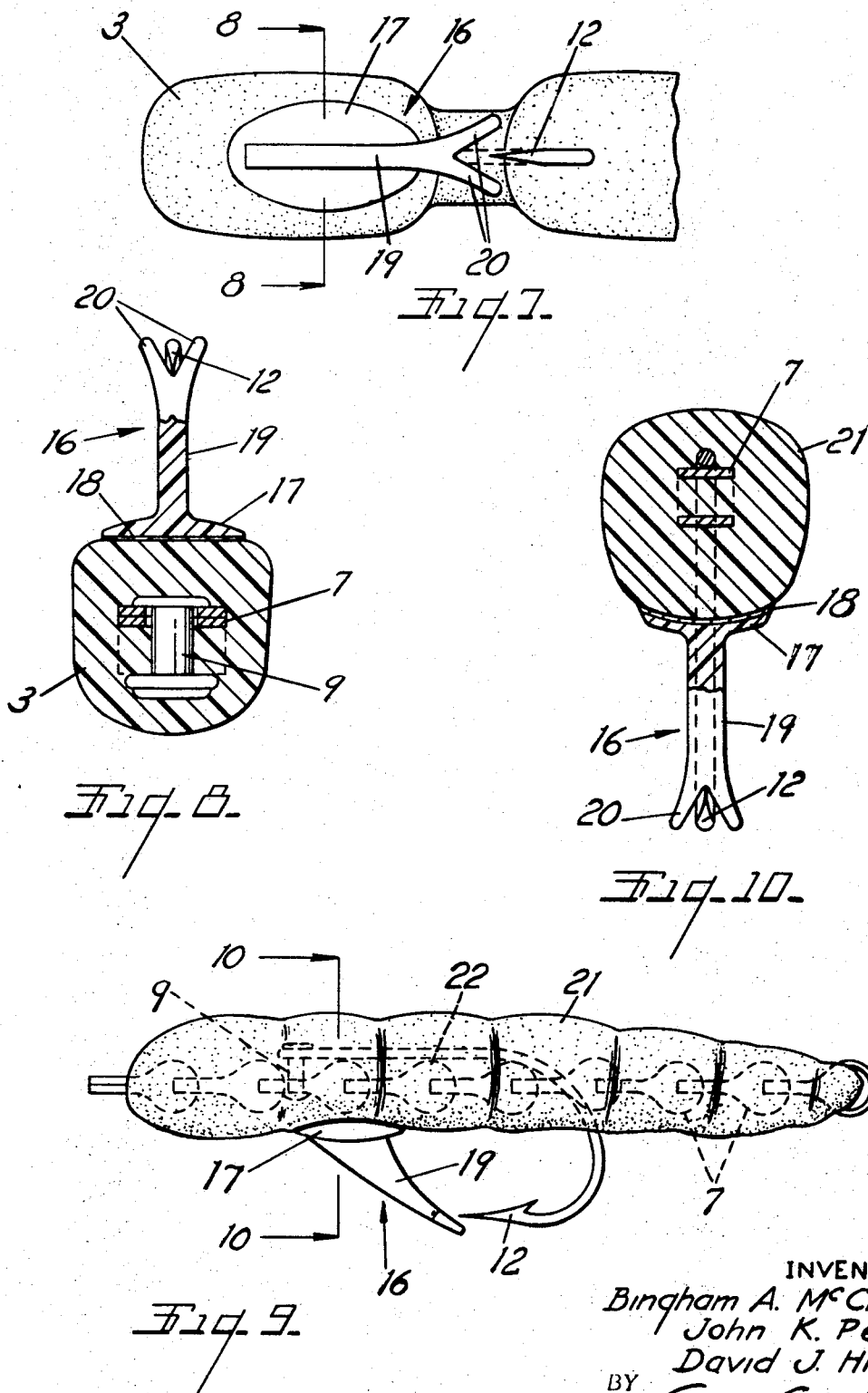

ABSTRACT OF THE DISCLOSURE

A body consisting of spaced masses of synthetic plastic molded around a flat folded link chain, with a joint in the chain between adjacent masses covered by a thin neck of plastic. Hooks have eyes riveted to one link and shanks that lie along the chain and pass through another link with the curved and barbed ends projecting from one of the body masses. The plastic of the body masses is relatively hard to resist tearing, while the thin necks and chain joints provide overall flexibility of the body. A plastic guard has a flat base adhered to the bottom of the body under the shank of the hook, and an integral plastic finger inclined backwardly to shield the barb of the hook from weeds.

OUTLINE OF INVENTION

The spaced body sections can be made of plastic that is hard and tough enough to resist tearing. The thin narrow necks between the body sections cover connections between links of the chain, providing lifelike flexibility for the body in spite of the harder plastic. They also permit the body to be molded around the chain in a single mold. The hooks are held in alignment with the chain by having their shanks laid along the chain with their eyes riveted to one link and their curved ends passing through another link of the chain and with the barbed ends projecting from one of the molded sections of the body.

The plastic weed guard is adhered to one of the body sections, where the fixed relation of the hook shank to the chain and the body section keeps the finger of the guard in operative position in front of the barb of the hook.

RELATED APPLICATIONS

The lure of the application is an improvement over the lure shown in the application of Bingham A. McClellan, Ser. No. 659,421, filed Aug. 9, 1967, now Pat. No. 3,429,066.

The drawings, of which there are two sheets, show a preferred form of the sectional body with the weed guard, and a modified mounting of the guard on a nonsectional body.

FIG. 1 is a side elevational view of the lure.

FIG. 2 is an enlarged fragmentary side elevational view of the reinforcing chain and front hook connection of the lure with two adjacent body sections shown in dotted lines.

FIG. 3 is a fragmentary top plan view of the chain and hook shown in FIG. 2.

FIG. 4 is an enlarged fragmentary view of a section of the reinforcing chain with two adjacent body sections of the lure indicated by dotted lines.

FIG. 5 is an enlarged cross sectional view taken along the plane of the line 5—5 in FIG. 4.

FIG. 6 is a cross sectional view through the flexible neck between the body sections taken along the plane of the line 6—6 in FIG. 4.

FIG. 7 is an enlarged bottom plan view of the weed guard attached to the lure.

FIG. 8 is a cross sectional view taken along the plane of the line 8—8 in FIG. 7.

FIG. 9 is an elevational view of the weed guard applied to a modified lure having a continuous body.

FIG. 10 is a cross sectional view taken along the plane of the line 10—10 in FIG. 9.

The first form of the lure consists of a reinforcing chain indicated generally by the numeral 1 around which a plurality of spaced body sections 2, 3 and 4 are molded. A front hook 5 has a straight shank 6 lapped along the top sides of several links 7 of the chain and is provided with an eye 8 which is secured to one of the links by means of a rivet 9 passed downwardly through the triangular-shaped hole 10 in the link. Towards its rear end the shank is angled downwardly as at 11 passing through the hole of a rearwardly-displaced link and emerging from the bottom of one of the body members 3 to the forwardly-turned barbed end 12 of the hook. A rear hook 13 is similarly secured to the chain and molded within other body sections 3. The rear body section 4 may be flatter than the other body sections so that the several body sections give the overall impression of a worm or eel.

It is a feature of the lure that there is a link connection 14 between body sections 3, as shown in FIG. 4, so that the chain is free to swivel or bend in a natural manner at these link connections. A narrow or thin integral neck 15 connects the body sections and surrounds the chain connections between the sections. This permits the body sections 2, 3 and 4 to be molded of a relatively hard plastic material so that the body sections effectively resist the tearing action of the teeth of the fish which takes the lure and other tearing forces encountered during fishing. As the result of the hardness of the body sections, the lure is practically indestructable but at the same time is completely flexible. The thin narrow necks 15 do not materially reduce the flexibility of the sectional body; and by using them the chain 1 can be stretched through a mold, and have the entire body molded therearound in an operation.

Synthetic plastics having a shore A durometer figure 25 and higher may be used, with hardnesses of 30 to 45 preferred, without detracting from the effectiveness of the lure to attract fish. Since most current lures of synthetic plastic are molded of materials having relatively soft durometer readings of between 5 and 10, it will be seen that the new form of lure with its harder plastic will be materially more durable.

The connection between the hooks and the reinforcing chain of the lure assures that the hooks will be held in projecting relation to the length of the chain and the body of the lure while all loads applied to the hooks are transmitted directly to the chain.

The weed guard 16 is formed of durable plastic of medium flexibility. The flat base 17 is secured to the bottom of a body section 2 or 3 below the eye of a hook, after the body is formed. A layer of adhesive or fusion between the base and the body is indicated at 18. The finger 19 is flat and tapered downwardly to two divergent branch tips 20 which lie on opposite sides of the point of the hook. The tapered shape of the finger plus the split tips 20 assure that the guard will be effective in preventing weeds from snagging on the hook; while at the same time the tips are flexible enough to deflect away from the hook when the lure is taken by a fish.

Since the hook is held in fixed relation to the body sections by being engaged by two links of the chain, attachment of the guard to the body section locates the finger of the guard relative to the point of the hook. The relatively hard plastic of the body sections 2 and 3 assists in assuring that the guard will remain in operative position.

The weed guard also has utility on more conventional lures. FIGS. 9 and 10 show an elongated, worm or eel-like body 21 with a chain 22 molded therein. As in the first form of the lure, the base 17 of the guard is secured by fusion or adhesion 18 to the surface of the body at a point in the body opposite to where the rivet 9 connects the eye of the hook to a link of the chain.

The body 21 may be softer and more flexible than the body sections 2 and 3 of the first form of the lure, but the engagement of the shank 6 of the hook with spaced links of the chain holds the point of the hook behind and between the branch tips 20 of the guard.

What is claimed as new is:

1. A fishing lure comprising a length of load bearing chain,
    a plurality of body sections of synthetic plastic molded around said chain with link connections in the chain disposed between adjacent sections of the body,
    narrow integral necks connecting said body sections and covering the link connections of the chain between the sections,
    a hook having a shank lapped along several links of the chain and having its forward end connected to one of the links, and
    a curved and barbed end on the hook extending through one link of the chain and projecting from one of the body sections.

2. A lure as defined in claim 1 in which said shank of said hook has an eye on its end parallel to said links with a rivet through the eye and one of said links connecting the shank to the chain.

3. A lure as defined in claim 2 in which said shank extends between two of said body sections.

4. A lure as defined in claim 1 in which the plastic of said body sections is of at least 25 durometer hardness on a Shore A hardness meter.

5. A lure as defined in claim 4 in which the hardness of said body sections is between 30 and 45.

6. A fishing lure comprising a length of metal chain,
    a plurality of spaced body sections of synthetic plastic molded around said chain with integral connections covering the links of the chains disposed between body sections,
    and at least one hook having its shank connected directly to said chain,
    said body sections having a hardness of at least 25 durometer on a Shore A hardness scale.

7. A lure as defined in claim 6 in which said body sections have a hardness between 30 and 45.

References Cited

UNITED STATES PATENTS

| | | | |
|---|---|---|---|
| 390,028 | 9/1888 | Loftie | 43—42.43 |
| 1,583,199 | 5/1926 | Taylor | 43—42.42 X |
| 2,481,789 | 9/1949 | Smith | 43—42.15 |
| 2,696,693 | 12/1954 | Markquart | 43—42.42 X |
| 2,860,440 | 11/1958 | Hendry | 43—42.3 |
| 2,869,279 | 1/1959 | Pretorius | 43—42.24 X |
| 3,429,066 | 2/1969 | McClellan | 43—42.24 |

SAMUEL KOREN, Primary Examiner

D. J. LEACH, Assistant Examiner

U.S. Cl. X.R.

43—42.15, 42.42, 42.43, 42.53